(12) United States Patent
Gammons

(10) Patent No.: US 8,087,451 B2
(45) Date of Patent: *Jan. 3, 2012

(54) PULL RELEASE CONNECTORS

(75) Inventor: Clifford E. Gammons, Loudon, TN (US)

(73) Assignee: Adroit Development, Inc., Loudon, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/917,838

(22) Filed: Nov. 2, 2010

(65) Prior Publication Data

US 2011/0042942 A1  Feb. 24, 2011

Related U.S. Application Data

(63) Continuation-in-part of application No. 11/298,399, filed on Dec. 9, 2005, now Pat. No. 7,828,336, and a continuation of application No. 11/562,788, filed on Nov. 22, 2006, now Pat. No. 7,823,625, which is a continuation-in-part of application No. 11/298,399.

(60) Provisional application No. 60/634,805, filed on Dec. 9, 2004, provisional application No. 60/738,739, filed on Nov. 22, 2005.

(51) Int. Cl.
  *A41D 13/00* (2006.01)
(52) U.S. Cl. ........................................ 165/46; 62/259.3
(58) Field of Classification Search ................. 165/104, 165/46, 104.11; 285/308, 317, 403
See application file for complete search history.

(56) References Cited

U.S. PATENT DOCUMENTS

| | | |
|---|---|---|
| 707,991 A | 8/1902 | Wareham |
| 2,898,130 A | 8/1959 | Hansen |
| 3,538,940 A | 11/1970 | Graham |
| 4,116,476 A | 9/1978 | Porter et al. |
| 4,436,125 A | 3/1984 | Blenkush |
| 4,541,457 A | 9/1985 | Blenkush |
| 4,753,268 A | 6/1988 | Palau |
| 4,863,201 A | 9/1989 | Carstens |
| 5,033,777 A | 7/1991 | Blenkush |
| 5,052,725 A | 10/1991 | Meyer et al. |
| 5,104,158 A | 4/1992 | Meyer et al. |
| 5,316,041 A * | 5/1994 | Ramacier et al. ........ 137/614.04 |
| 5,494,074 A | 2/1996 | Ramacier, Jr. et al. |
| 5,845,943 A | 12/1998 | Ramacier, Jr. et al. |
| 5,941,577 A | 8/1999 | Musellec |
| 6,231,089 B1 | 5/2001 | DeCler et al. |
| 2005/0057042 A1 | 3/2005 | Wicks |
| 2007/0085340 A1 | 4/2007 | Gammons |
| 2008/0061553 A1 | 3/2008 | Schmidt |

* cited by examiner

*Primary Examiner* — Tu B Hoang
*Assistant Examiner* — Brian Jennison
(74) *Attorney, Agent, or Firm* — Knox Patents; Thomas A. Kulaga

(57) ABSTRACT

An apparatus for connecting two devices with a quick disconnect feature. A male plug is insertable into a female receiver and latched into position with a latch. The male plug is disconnected from the receiver by pulling the male plug out of the receiver with a force greater than an operating force. The male plug has a groove that engages a latch in the female receiver. The interface of the groove and the latch includes a bevel engaging a corner joining a surface perpendicular to a longitudinal axis and a surface parallel to the longitudinal axis.

19 Claims, 5 Drawing Sheets

PULL RELEASE CONNECTORS

CROSS-REFERENCE TO RELATED APPLICATIONS

This application claims the benefit of U.S. Provisional Application No. 60/634,805, filed Dec. 9, 2004, and is a continuation-in-part of U.S. application Ser. No. 11/298,399, filed Dec. 9, 2005. This application also is a continuation of U.S. application Ser. No. 11/562,788, filed on Nov. 22, 2006, which is a continuation-in-part of U.S. application Ser. No. 11/298,399, filed on Dec. 9, 2005, and claims the benefit of U.S. Provisional Application Ser. No. 60/738,739, filed on Nov. 22, 2005. All of these applications are incorporated herein in their entirety by reference.

STATEMENT REGARDING FEDERALLY SPONSORED RESEARCH OR DEVELOPMENT

Not Applicable

BACKGROUND OF THE INVENTION

1. Field of Invention

This invention pertains to a quick-disconnect safety connector for connecting two hoses. More particularly, this invention pertains to a safety connector including a male plug configured to be retained within a female receiver to establish fluid communication between the two hoses, and which is releasable from engagement upon application of opposing forces on the male plug and female receiver.

2. Description of the Related Art

It is well known in the art of hose connectors to provide various configurations of such connectors to establish fluid communication between selected devices. Typically, a positively-locked connection is made in order to prevent unselected disengagement of the devices in such communication. Release mechanisms of various configurations are provided for unlocking the connection between the components of the connectors. Typically, release mechanisms require active engagement of the mechanism prior to disengagement of the two devices.

While conventional release mechanisms provide positive locking mechanisms for securing two devices in fluid communication, they can also be cumbersome to disengage. In certain situations it is necessary to quickly disconnect devices while the operator may not have the ability to manipulate the release mechanism, grasp both hoses connecting the devices, and pull the two devices apart.

Safety considerations come into play when articles of clothing are tethered to stationary objects. It is known to connect fluid systems with releasable connectors. Typically, a positive-lock connection is made in order to prevent undesired disengagement of the devices. Release mechanisms of various configurations are known for unlocking the connection between the components of the connectors. The release mechanisms require active engagement of the mechanism prior to disengagement of the two devices. For example, U.S. Pat. No. 5,104,158, issued to Meyer, et al., on Apr. 14, 1992, titled "Two piece molded female coupling," discloses a connector that is released only when an operator is pressed.

BRIEF SUMMARY OF THE INVENTION

A quick-disconnect safety connector for connecting two devices in fluid communication is provided. The connector includes a male adapter and a female adapter configured to receive the male adapter. The female adapter includes a locking mechanism for engaging the male adapter in order to establish fluid communication through the connector.

The male adapter defines a groove configured to receive the locking mechanism. An O-ring is carried by the male adaptor at its largest diameter in order to seal the connection between the male plug and the female receiver.

The female adapter defines an opening for receiving a latch operator. The latch operator defines a handle which extends above the receiver body. Between the handle and the receiver body is a spring, which fits into a spring cup formed in the handle. The latch operator further includes a tang adapted to be received within the latch body opening. The tang defines an opening configured to receive the outboard section of the plug. The tang further defines a lower border of the opening being dimensioned for engaging the groove for the purpose of interlocking the female adapter and the plug attached to the male adapter. Additionally, the tang defines a first side inboard to the first hose secured to the female adapter, and a first chamfer on the first side along the lower border of the opening. A corner defines the boundary between the first side of the tang and the first chamfer.

The tang defines a second chamfer on the second side along the lower border of the opening. An apex is defined by the interface between the first chamfer and the second chamfer along the lower border of the opening. When the plug of the male adapter is inserted into the female adapter, the plug nose engages the second chamfer and forces the handle toward the receiver body by compressing the spring.

In normal use, contact is made between the apex of the lower border of the opening defined by the tang and the lower surface of the groove. This contact is maintained by the upward force of the biased latch operator. The first chamfer is defined such that, in the event of contact with the male adapter groove, the corner of the first shoulder is contacting only the first chamfer. Neither the first side of the tang nor any corner that may define the boundary between the first side of the tang and the first chamfer is contacting the corner of the first shoulder. Upon application of a sufficient pulling force on the hoses, the male adapter and female adapter are disengaged.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A quick disconnect safety connector for connecting two devices in fluid communication is disclosed. The safety connector of the present invention is provided for connecting two devices in fluid communication in such a manner as to allow a positive connection between a male plug and a female receptor. The components of the connector are disconnected by manipulating a locking mechanism and pulling the components apart. However, the male plug and female receptor are configured to also be releasable one from the other upon the application of a sufficient force along the longitudinal axis of the connector and without manipulating the locking mechanism.

Figure 1:
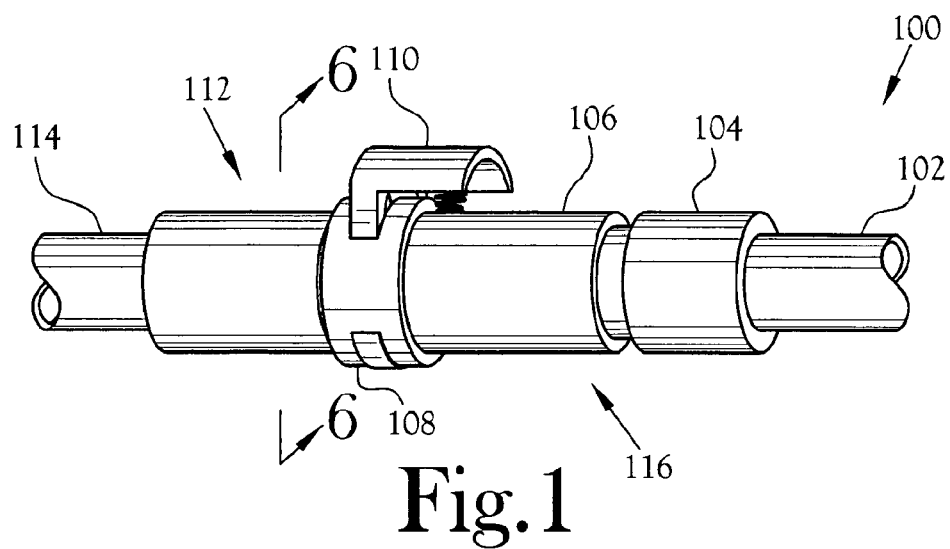
FIG. 1 is a perspective view of one embodiment of a quick disconnect safety connector constructed in accordance with several features of the present invention.

FIG. 1 illustrates a perspective view of one embodiment of the connector 100. The connector 100 includes the male adapter 112 and the female adapter 116. The female adapter 116 attaches to the first hose 102 via the first hose clamp 104. The male adapter 112 likewise attaches to the second hose 114. The female adapter 116 has a receiver body 106 attached to a latch body 108. The latch body 108 carries a latch operator 110 which defines the locking mechanism.

Figure 2:
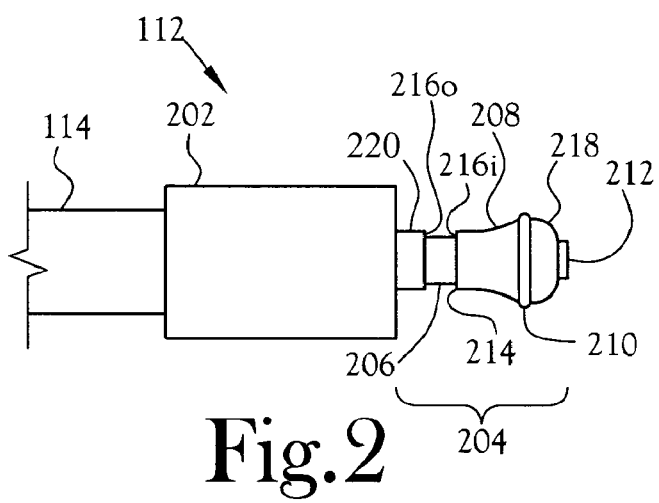
FIG. 2 is a side elevation view of one embodiment of a male plug included in the connector illustrated in FIG. 1.

FIG. 2 illustrates a side view of one embodiment of the male adapter 112. The male adapter 112 attaches to the second hose 114 via the second hose clamp 202. Adjacent the hose clamp 202 is a plug 204 that has a groove 206 defining the outboard section 208 of the plug 204 and the inboard section 220 of the plug 204. In the illustrated embodiment, the groove 206 defines side walls 216i, 216o. In this embodiment, the groove 206 defines a lower corner 214 of the outboard section 208 of the plug 204.

In the illustrated embodiment, the outboard section of the plug 204 defines a substantially bulb-shaped configuration from the groove 206 and toward the plug nose 212, which is configured to be received by the female receiver 116. The plug 204 defines a convex surface 218 adjacent to plug nose 212. The outboard section of the plug 204 defines a groove along its maximum diameter to receive an O-ring 210. The O-ring 210 serves to seal the connection between the plug 204 and the female receiver 116 to establish sealed fluid communication. In another embodiment, the outboard section of the plug 204 has a cylindrical shape. In various embodiments, the plug 204 includes a free flowing conduit or a valve assembly that prevents fluid leakage when the plug 204 is not received by the female adapter 116.

The first hose 102, which is attached to the female adapter 116, is secured by the first hose clamp 104. Similarly, the second hose 114, which is attached to the male adapter 112, is secured by the second hose clamp 202. Those skilled in the art will recognize that the hose clamps 104, 202 can be of various types without departing from the spirit and scope of the present invention.

Figure 3:
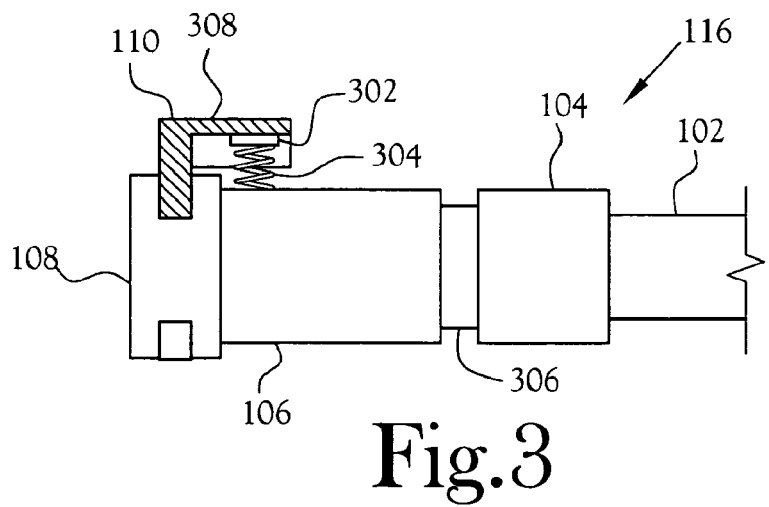
FIG. 3 is a side elevation view of one embodiment of a female receiver included in the connector illustrated in FIG. 1.

FIG. 3 illustrates a side view of one embodiment of the female adapter 116. In this view, a latch operator 110 is received in the latch body 108. The latch operator 110 defines a handle 308, which extends above the receiver body 106. Between the handle 308 and the receiver body 106 is a spring 304, which fits into a spring cup 302 formed in the handle 308.

Figure 4:
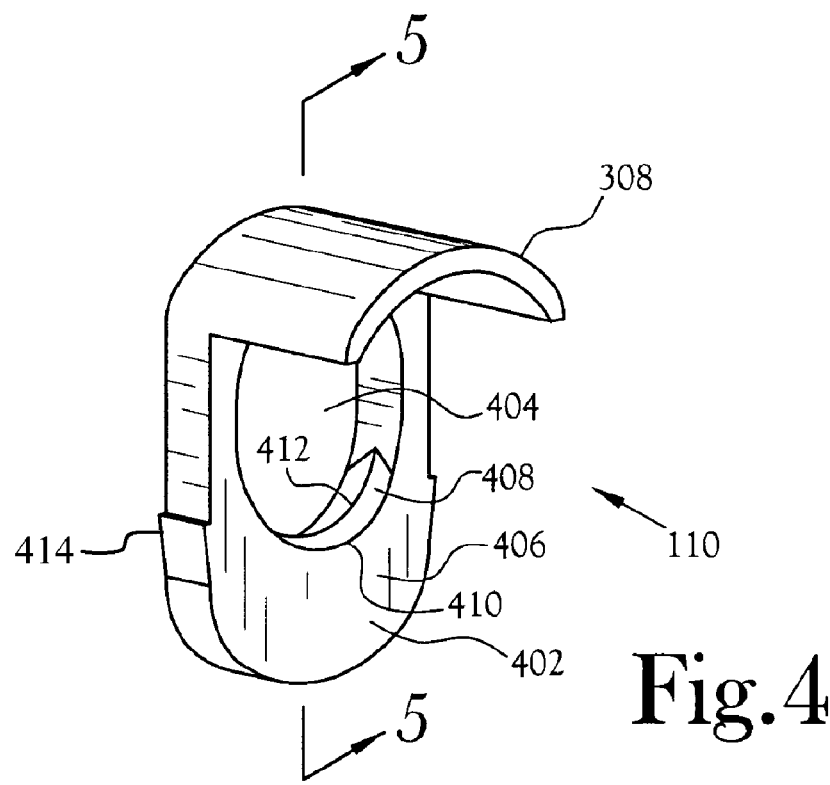
FIG. 4 is a perspective view of one embodiment of a latch operator carried by the female receiver illustrated in FIG. 3.

FIG. 4 illustrates a perspective view of one embodiment of the latch operator 110. The latch operator 110 includes the handle 308 and a tang 402, which extends into the latch body 108. The tang 402 defines an opening 404 configured to receive the outboard section of the plug 208. The opening 404 defines a substantially oval configuration. The tang 402 further defines a lower border 412 of the opening 404 being dimensioned for engaging the groove 206 for the purpose of interlocking the female adapter 116 and the plug 204 attached to the male adapter 112. Additionally, the tang 402 defines a first side 406 inboard to the first hose 102 secured to the female adapter 116, and a first chamfer 408 on the first side 406 along the lower border 412 of the opening 408. A corner 410 defines the boundary between the first side 406 of the tang 402 and the first chamfer 408.

In one embodiment, the latch operator 110 is fabricated of a hard plastic that is capable of withstanding repeated interactions with the groove 206 without wearing appreciably. In still another embodiment, the latch operator 110 includes a lubricant that aids in the interaction with the groove 206. In one embodiment, the lubricant is embedded in, or integral to, the material of the latch operator 110.

Figure 5:
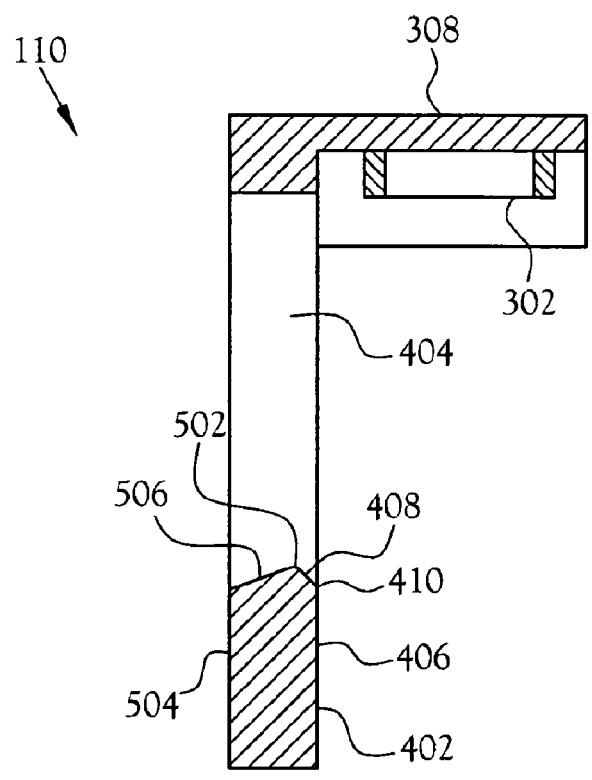
FIG. 5 is a side elevation view, in section, of the latch operator, taken along lines 5-5 of FIG. 4.

FIG. 5 illustrates a cross-sectional view of the latch operator 110 showing the opening 404 and the spring cup 302. In the illustrated embodiment, the spring cup 302 is adapted to receive the end of the spring 304. FIG. 5 also shows the tang 402, which defines the second side 504 outboard to the first hose 102 secured to the female adapter 116. The tang 402 defines the second chamfer 506 on the second side 504 along the lower border of the opening 404. An apex 502 is defined by the interface between the first chamfer 408 and the second chamfer 506 along the lower border 412 of the opening 404. When the plug 204 of the male adapter 112 is inserted into the female adapter 116, the plug nose 212 engages the second chamfer 506 and forces the handle 308 toward the receiver body 106 by compressing the spring 304. In one method, the handle 308 is pressed against the receiver body 106 by the human operator, thereby reducing the engagement of the second chamfer 506 with the groove 206 of the plug 112. In another embodiment, force of the plug 204 against the second chamfer 506 moves the latch operator 110 without any force applied on the handle 308.

Figure 6:
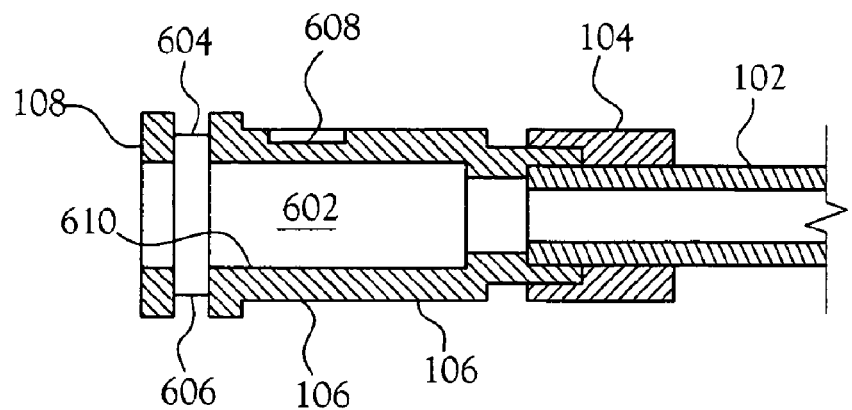
FIG. 6 is a side elevation view, in section, of the female receiver, taken along lines 6-6 of FIG. 1.

FIG. 6 illustrates a cross-sectional view of the female adapter 116. Inside the female adapter 116 is a cavity 602 for receiving the outboard section 208 of the plug 204, including the plug nose 212 and O-ring 210. The O-ring 210 engages the inside surface of the cavity 602, thereby forming a seal between the plug 204 of the male adapter 112 and the female adapter 116. The cavity further defines the lower surface of the cavity 610, which assumes greater relevance later in this specification. The latch body 108 has a slot 604 into which the tang 402 is inserted until it extends down to the lower end 606 of the slot. In one embodiment, the tang 402 has opposing protuberances 414 that pass through the slot 604 and the lower end 606 such that the tang 402 is held captive in the latch body 108. In another embodiment, the protuberances 414 are located in various positions such that they engage corresponding surfaces in the latch body 108 to retain the tang 402 in the latch body 108.

The receiver body 106 has a recess, or spring cup, 608 that receives the end of the spring 304 opposite the end that engages latch handle 308. The two spring cups 302, 608 secure the spring 304 such that is held captive to the receiver 116. In one embodiment, the spring 304 has a conical shape, that is, one end of the spring 304 has a smaller diameter than the opposite end of the spring 304. In one embodiment with the conical spring 304, the end with the smaller diameter contacts the receiver body 106 and, therefore, the spring cup 608 on the receiver body 106 is dimensionally smaller than the spring cup 302 associated with the latch handle 308.

Figure 7:
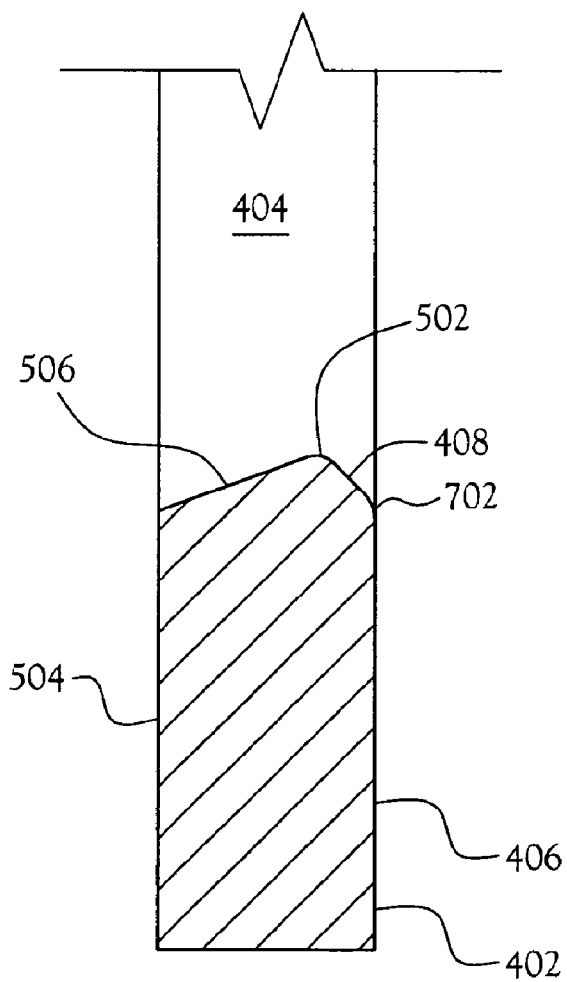
FIG. 7 is an enlarged cross-sectional view of a portion of the latch operator, taken along lines 5-5 of FIG. 4.

FIG. 7 illustrates a close-up cross-sectional view of the latch operator 110 showing the details of the first chamfer 408 and the second chamfer 506. In the illustrated embodiment, the first chamfer 408 forms an angle relative to the first side 406 of the tang 402 that is greater than the angle formed by second chamfer 506 relative to the second side 504 of the tang 402. In one embodiment, the angle of the first chamfer 408 is 70.degree. relative to the first side 406 of the tang 402, and the angle of the second chamfer 506 is 60.degree. relative to the second side 504 of the tang 402. In the illustrated embodiment, there is a rounded interface 702 between the first chamfer 408 and the first side 406 of the tang 402. The rounded interface 702 provides a surface for contact with the lower corner 214 of the outboard section 208 of the plug 204, enabling the male adapter 112 to slide as it is pulled out of the female adapter 116. However, it will be understood that the present invention is not limited to the various configurations and angles represented herein, but such are exemplary only When making a connection between the male adapter 112 and the female adapter 116, as the plug nose 212, O-ring 210, and the remainder of the outboard section 208 of the plug 204 pass through the opening 404, the lower border 412 of the opening 404, including the second chamfer 506, engages the groove 206, at which time the spring 304 forces the handle 308 away from the receiver body 106 and causes the lower end of the tang 402, which is distal to the latch handle 308, to enter the groove 206, thereby latching, or locking, the plug 204 of the male adapter 112 in the female adapter 116. Alternatively, the latch handle 308 is pressed toward the receiver body 106, thereby disposing the opening 404 such that the outboard section 208 of the plug 204 passes freely through the opening 404.

Pressure applied to a fluid in the hoses 102, 114 tends to apply force to separate the male adapter 112 from the female adapter 116. This force causes the first chamfer 408 of the tang 402 to engage the lower corner 214 of the outboard section 208 of the plug 204. The configuration of the first chamfer 408 is such that the latch tang 402 remains stationary when operating pressure is applied to the fluid in the hoses 102, 114. When the tensile force applied between the male adapter 112 and the female adapter 116 exceeds a set value, the lower corner 214 of the outboard section 208 of the plug 204 engages the first chamfer 408 and forces the tang 402 to move laterally against the spring 304 pressure, thereby allowing the male adapter 112 to separate from the female adapter 116.

The connector 100 is suitable for use where the connector 100 must be separated without recourse to operating the latch 110, such as might happen when the connector 100 needs to be separated during an emergency. In such a case, the inside chamfer 408 with rounded interface 702, in combination with the groove 206 and the spring 304, allows the male adapter 112 to be pulled out of the female adapter 116 with little force. The inside chamfer 408 is configured such that the latch holds under operating pressure, yet gives way when the connector 100 is pulled apart. Further, the spring 304 is of such a length, width, and strength that the force to disconnect is controlled.

Figure 8A:
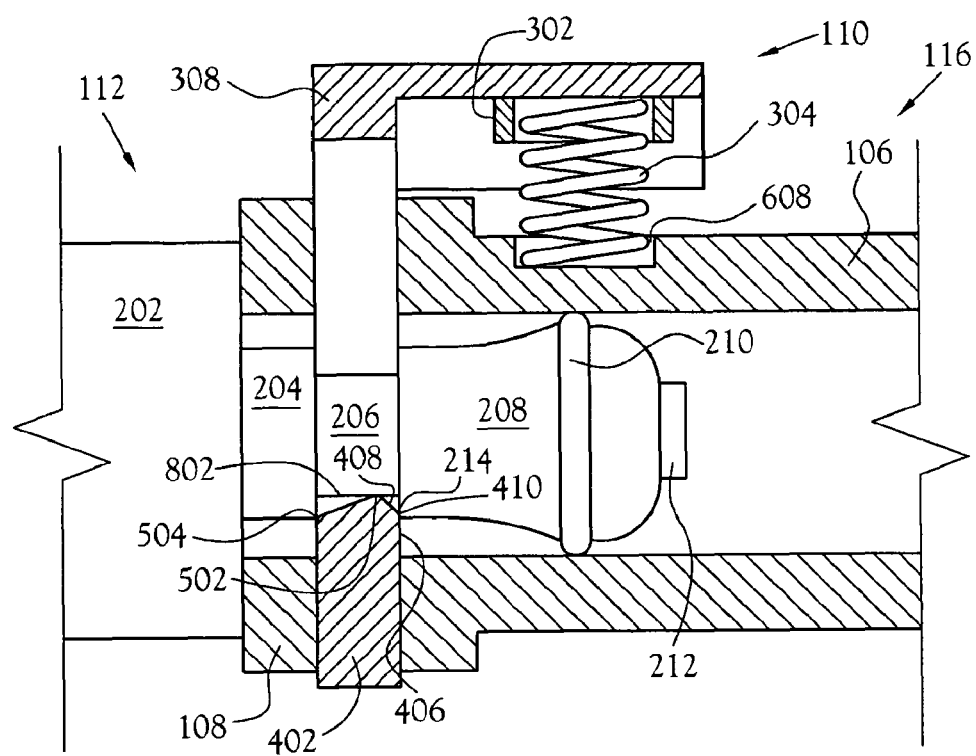
FIG. 8A is a partial cross-sectional view of the connector of FIG. 1, showing the male adaptor engaged within the female adapter.
Figure 8B:
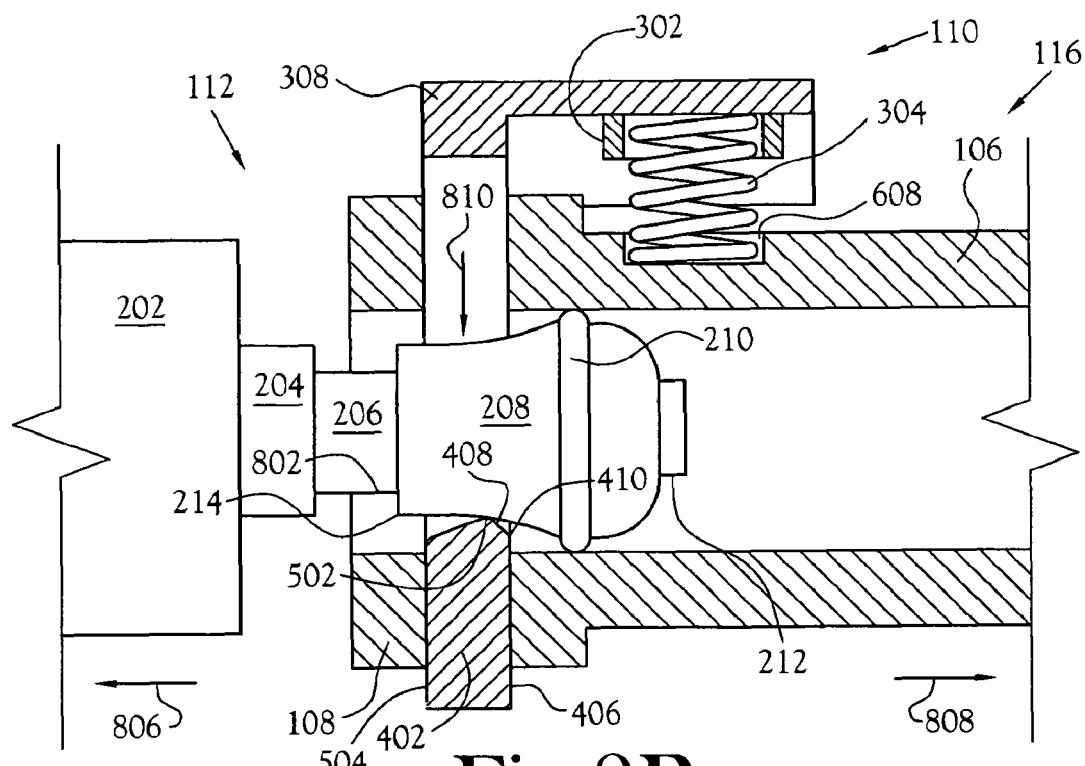
FIG. 8B is a partial cross-sectional view of the connector of FIG. 1, showing the male adapter being removed from the female adapter.
Figure 8C:
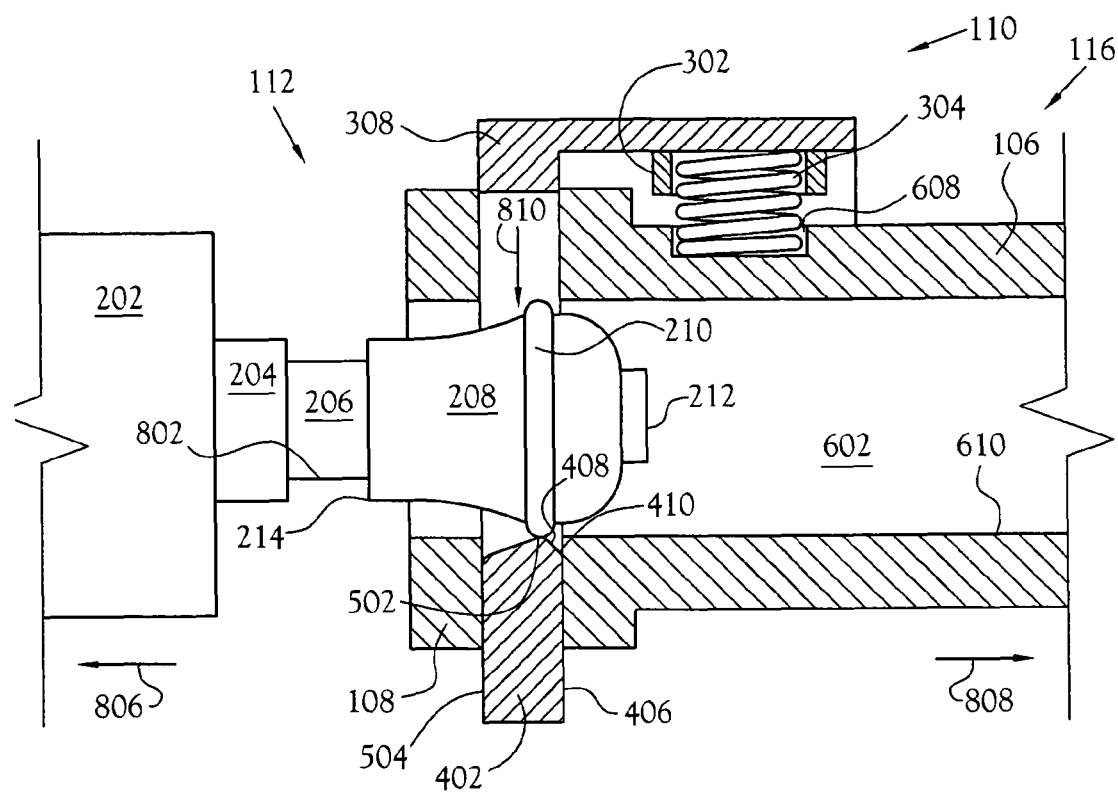
FIG. 8C is a partial cross-sectional view of the connector of FIG. 1, showing the male adapter being removed further from the female adapter.

FIGS. 8A, 8B and 8C further reveal the functioning of the connector. FIG. 8A shows the male adapter 112 fully secured in the female adapter 116. There is contact between the apex 502 of the lower border 412 of the opening 404 defined by the tang 402 and the lower surface 802 of the groove 206. This contact is maintained by the upward force of the biased latch operator 110. During this stage, contact may occur between the first chamfer 408 and the corner of the first shoulder 214. The first chamfer 408 is defined such that, in the event of such contact, the corner of the first shoulder 214 engages a minimal amount of the tang first side 406 in order to withstand normal operating pressures within the connector 100 without the male adapter 112 becoming disengaged from within the female adapter 116.

Upon application of a sufficient pulling force on the hoses 102, 114, the male adapter 112 and female adapter 116 are disengaged. As illustrated in FIG. 8B, the apex 502 of the lower border 412 of the opening 404 defined by the tang 402 no longer is contacting the lower surface 802 of the groove 206. The pulling forces 806, 808, in promoting the withdrawal of the male adapter 112 from the female adapter 116, cause the corner of the first shoulder 214 to engage and operate against the first chamfer 408, forcing the biased latch operator 110 downward, thereby allowing the corner of the first shoulder 214 to clear the apex 502. At this stage, the contour of the outboard section 208 of the plug 204 continues to translate the pulling force into a downward force 810 that opposes the biased latch operator 110 and forces the biased latch operator 110 downward, thereby facilitating the withdrawal of the male adapter 112.

As illustrated in FIG. 8C, as the pulling forces continue as illustrated by arrows 806, 808, the male adapter 112 continues to be withdrawn until the apex 502 of the lower border 412 of the opening 404 disengages from the male adapter 112 and the hoses 102 and 114 are disconnected. The O-ring 210 of the male adapter 204, which defines the section of the plug 204 having the greatest diameter, is illustrated as engaging the apex 502. The biased latch operator 110 is forced downward in the direction of arrow 810 to such an extent that the apex 502 is flush with the lower surface 610 of the cavity 602 of the female adapter 116, at which point the cavity of the female adapter 602 presents a clear channel for the withdrawal of the remainder of the male adapter 112.

In another embodiment, the inboard sidewall 216i of the groove 206 has a partial conical shape, that is, the sidewall 216i forms an obtuse angle with the bottom of the groove 206, and the bottom 412 of the opening 404 in the latch operator 110 is flat, that is, perpendicular to the inboard face 402 of the latch operator 110. In other words, a chamfer equivalent to the chamfer 408 is located on the male adapter 112 and there is no chamfer on the female adapter 116. In such an embodiment, the function of automatically releasing the male adapter 112 from the female adapter 116 is implemented by the chamfer on the inboard sidewall 216i of the groove 206 of the male adapter 112 engaging the opening 404 in the latch operator 110 of the female adapter 116. The chamfer on the inboard sidewall 216i of the groove 206, when engaging the opening 404 with a pulling force over a specified limit, forces the tang 402 to move to a position where the bottom 412 of the opening 404 makes contact with the outside surface of the plug 204, thereby allowing the plug 204 to slide over the bottom 412 and be removed from the central passage 602.

The apparatus includes various functions. The function of allowing insertion of the male adapter 112 into the female adapter 116 is implemented, in one embodiment, by the outboard chamfer 506 in the opening 404 in the latching operator 110 of the female adapter 116. The outboard chamfer 506 is dimensioned and configured to engage the plug nose 212 of the male adapter 112 to move the tang 402 along the z-axis 810 to move the opening 404 in the tang 402 in register with the central passage 602, thereby allowing the plug 204 to be received by the central passage 602.

The function of securing the male adapter 112 in the female adapter 116 is implemented, in one embodiment, by the bottom 412 of the opening 404 in the latching operator 110 of the female adapter 116 configured to engage the groove 206 in the male adapter 112. In one embodiment, the bottom 412 includes an inboard chamfer 408 that engages the groove 206 without, in the absence of a pulling force 806, 808, causing movement of said tang 402, thereby locking the plug 204 in the central passage 602. In another embodiment, the bottom 412 is flat and the groove sidewall 216i that is proximate the distal end of the plug 204 has a chamfer that engages the tang 402 without, in the absence of a pulling force 806, 808, causing movement of said tang 402, thereby locking the plug 204 in the central passage 602.

The function of automatically releasing the male adapter 112 from the female adapter 116 is implemented, in one embodiment, by the inboard chamfer 408 in the opening 404 in the latch operator 110 of the female adapter 116. The inboard chamfer 408, when engaged by the groove corner 214 with a pulling force 806, 808 over a specified limit, forces the tang 402 to move to a position where the apex 502 makes contact with the outside surface of the plug 204, thereby allowing the plug 204 to slide over the apex 502 and be removed from the central passage 602. In another embodiment, the bottom 412 is flat and the groove sidewall 216i that is proximate the distal end of the plug 204 has a chamfer that, when engaged by a corner 410 of the tang 402 with a pulling force 806, 808 over a specified limit, forces the tang 402 to move the opening 404 into register with the central passage, or cavity, 602, thereby allowing the plug 204 to be removed from the central passage 602.

From the foregoing description, it will be recognized by those skilled in the art that a connector for connecting two hoses has been provided. The connector is configured to accomplish a positive fluid connection between two devices at normal operating pressures. However, the connector is further configured to provide a quick disconnect between the components of the connector as a result of a sufficient axial force on the connector.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept. While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for releasably connecting two devices in fluid communication, said apparatus including:
    a male adaptor having a connector and a plug with a groove, said connector configured to connect to a fluid conduit, said plug being symmetrical around a longitudinal axis, said groove located medially on said plug;
    a female receptor having a receiver body with a cavity, said female receptor configured to receive said plug of said male adaptor in said cavity; and
    a locking mechanism configured to secure said male adaptor and said female receptor together to accomplish fluid communication through said male adaptor and said female receptor, said locking mechanism including a surface of said groove and a tang biased to protrude into said cavity from said receiver body, said locking mechanism including a first chamfer that engages an edge of a surface substantially perpendicular to said longitudinal axis of said plug when said plug is inserted in said cavity, said locking mechanism further configured to allow disconnection of said male adaptor from said female receptor upon application of an axial force on said connector, and said axial force being greater than an operating force.

2. The apparatus of claim 1 wherein said first chamfer is a bevel joining two surfaces, one of said two surfaces being substantially perpendicular to said longitudinal axis of said plug when latched in said cavity, a second of said two surfaces being substantially parallel to said longitudinal axis of said plug when latched in said cavity.

3. The apparatus of claim 1 wherein said operating force is defined by fluid pressure within said male adaptor and said female receptor during operating conditions.

4. The apparatus of claim 1 wherein said tang is dimensioned to be slidably received within a latch receptor in said receiver body, said tang defining a tang opening dimensioned to receive said plug of said male adapter, and said tang being biased toward and received within a portion of said groove of said plug.

5. The apparatus of claim 4 wherein said tang opening defines a border adapted to engage said groove of said male adapter to establish a positive connection between said male adaptor and said female receptor, said tang having a first side and a second side opposite said first side, said first side proximate said distal end of said plug of said male adapter when said plug is received in said cavity,
    said border of said tang opening having said first chamfer proximate said first side, said first chamfer engaging said edge of said groove when said plug is received in said cavity, said edge defined by a sidewall of said groove proximate a distal end of said plug, said sidewall being said surface that is substantially perpendicular to said longitudinal axis of said plug, and
    whereby removal of said plug from said female receptor is facilitated by said axial force applied in opposition to the connection between said male adapter and said female receptor, said edge of said groove encouraging said border of said tang away from said cavity as said plug is withdrawn from said female receptor.

6. The apparatus of claim 5 wherein said tang further defines a second chamfer proximate said second side and said border, said second chamfer defined in a configuration selected to facilitate insertion of said plug of said male adapter in said female adapter.

7. The apparatus of claim 4 wherein said tang opening defines a border configured to engage said groove of said male adapter to establish a positive connection between said male adaptor and said female receptor, said tang having a first side and a second side opposite said first side, said first side being proximate said distal end of said plug of said male adapter when said plug is received in said cavity, said first side being substantially perpendicular to a central axis of said cavity, said border including said edge of said first side, said first side being said surface that is substantially perpendicular to said longitudinal axis of said plug when said plug is inserted in said cavity, said groove of said plug having a sidewall proximate a distal end of said plug, said sidewall including said first chamfer, and whereby removal of said plug from said female receptor is facilitated by said axial force applied in opposition to the connection between said male adapter and said female receptor, said first chamfer of said groove encouraging said edge of said tang away from said cavity as said plug is withdrawn from said female receptor.

8. The apparatus of claim 1 wherein said tang has a tang opening and a first side, said first side proximate said distal end of said plug when said plug is latched in said cavity, said first chamfer proximate said first side and said tang opening, said groove has a sidewall proximate said distal end of said plug, said sidewall being substantially perpendicular to said longitudinal axis of said plug, said sidewall including said edge, whereby said first chamfer of said tang encourages said tang away from said cavity as said plug is withdrawn from said cavity.

9. The apparatus of claim 1 wherein said groove has a sidewall proximate said distal end of said plug, said sidewall including said first chamfer, said tang having a tang opening, said tang having a first side proximate said distal end of said plug of said male adapter when said plug is latched in said cavity, said edge defined by an intersection of said first side with said tang opening, whereby said first chamfer of said groove encourages said tang away from said cavity as said plug is withdrawn from said cavity.

10. An apparatus that releasably receives a male adapter having a plug with a groove, the groove having a sidewall proximate a distal end of the plug, the sidewall substantially perpendicular to a longitudinal axis of the plug, the sidewall having an edge, said apparatus including:

a body having a face with an opening, said opening defining a distal end of a cavity having a longitudinal, axis, said cavity configured to receive the plug of the male adapter through said opening; and a latch biased to protrude into said cavity, said latch positioned to engage the groove in the male adapter when the plug is latched in said cavity, said latch having a first chamfer proximate a side of said latch that is distal to said face of said body, said latch engaging the groove of the of the plug when the plug is latched in said cavity and thereby restricting removal of said plug from said cavity, said latch encouraged to move out of said cavity when the edge of the groove of the plug engages said first chamfer upon application of an axial force that exceeds an operating force.

11. The apparatus of claim 10 wherein said first chamfer is a bevel joining a first side of said latch to a second surface, and said first side being distal to said face of said body.

12. The apparatus of claim 10 wherein said operating force is defined by fluid pressure within said body during operating conditions.

13. The apparatus of claim 10 wherein said latch includes a second chamfer proximate said face of said body, said second chamfer configured to engage the distal end of said the plug whereby said latch is encouraged to move out of said cavity and into said body when the plug is inserted into said cavity.

14. The apparatus of claim 10 wherein said latch includes a latch operator and a tang, said latch operator accessible from outside said body, said tang having a tang opening sized to receive said plug when said tang opening is in register with said cavity, and said latch operator causing said tang opening to be in register with said cavity when manually operated.

15. The apparatus of claim 10 further including the male adapter having the plug with the groove, the groove having the sidewall proximate the distal end of the plug, and said sidewall substantially perpendicular to a longitudinal axis of the plug, said sidewall having an edge.

16. An apparatus that releasably engages a female adapter having a cavity, the female adapter having a latch that is biased to protrude into the cavity, the latch having a surface distal to an opening in the female adapter, the opening defining an end of the cavity, the surface being defined by a plane that is substantially perpendicular to an axis of the cavity, said apparatus including:

a body configured to connect to a fluid conduit; and a plug extending from said body, said plug having a groove medially positioned, said groove having a sidewall proximate a distal end of said plug, said sidewall including a first chamfer configured to engage the latch protruding into the cavity and thereby latch said plug in said cavity and restrict removal of said plug from said cavity, and said plug releasable from said cavity upon application of an axial force that exceeds an operating force, whereby said first chamfer of said groove encourages the latch away from the cavity as said plug is withdrawn from the cavity.

17. The apparatus of claim 10 wherein said first chamfer is a bevel joining a first surface to a second surface, said first surface being substantially perpendicular to a longitudinal axis of said plug, said second surface being substantially parallel to said longitudinal axis of said plug.

18. The apparatus of claim 16 wherein said operating force is caused by fluid pressure within said plug during operating conditions.

19. The apparatus of claim 16 further including the female adapter having the cavity and the latch, the latch being biased to protrude into the cavity, the latch having a surface distal to an opening in the female adapter, the surface being defined by a plane that is normal to an axis of the cavity, and the opening defining an end of the cavity through which said plug is received.

* * * * *